United States Patent [19]
Meisinger

[11] Patent Number: 6,079,752
[45] Date of Patent: Jun. 27, 2000

[54] SANITARY QUICK CONNECTOR

[75] Inventor: Stanlee W. Meisinger, Golden Valley, Minn.

[73] Assignee: Fastest, Inc., St. Paul, Minn.

[21] Appl. No.: 08/965,585

[22] Filed: Nov. 6, 1997

[51] Int. Cl.[7] .............................. F16L 23/02; F16L 37/00
[52] U.S. Cl. .......................... 285/363; 285/315; 285/388
[58] Field of Search ................................... 285/315, 316, 285/81, 84, 85, 82, 388, 363, 364; 464/901

[56] References Cited

U.S. PATENT DOCUMENTS

| | | | |
|---|---|---|---|
| 964,578 | 7/1910 | Stephens | 285/388 |
| 1,297,719 | 3/1919 | Myers . | |
| 2,388,179 | 10/1945 | Prowd . | |
| 2,860,893 | 11/1958 | Clark . | |
| 3,138,393 | 6/1964 | Livingston . | |
| 3,140,072 | 7/1964 | Sciuto | 285/315 |
| 3,291,442 | 12/1966 | Cranage . | |
| 3,655,225 | 4/1972 | Major . | |
| 3,727,952 | 4/1973 | Richardson . | |
| 3,757,836 | 9/1973 | Masuda . | |
| 3,825,223 | 7/1974 | Richardson . | |
| 4,366,945 | 1/1983 | Blauenstein . | |
| 4,765,657 | 8/1988 | Cruse | 285/315 |
| 4,776,614 | 10/1988 | Marrison et al. . | |
| 4,805,417 | 2/1989 | Weaver et al. . | |
| 4,884,830 | 12/1989 | Meisinger . | |
| 4,889,149 | 12/1989 | Weaver et al. . | |
| 5,074,332 | 12/1991 | Jones . | |
| 5,095,947 | 3/1992 | Weh et al. . | |
| 5,209,528 | 5/1993 | Weh et al. . | |
| 5,265,917 | 11/1993 | Hitz . | |
| 5,390,963 | 2/1995 | Namekawa | 285/316 |
| 5,560,407 | 10/1996 | Swinford . | |
| 5,575,510 | 11/1996 | Weh et al. . | |
| 5,580,099 | 12/1996 | Eaton . | |
| 5,613,816 | 3/1997 | Cabahug . | |

FOREIGN PATENT DOCUMENTS

| | | | |
|---|---|---|---|
| 1419800 | 10/1965 | France | 285/315 |
| 36 08 463 A 1 | 9/1987 | Germany . | |
| WO 90/14546 | 11/1990 | WIPO . | |
| WO 96/22488 | 7/1996 | WIPO . | |
| WO 96/35905 | 11/1996 | WIPO . | |

*Primary Examiner*—Anthony Knight
*Assistant Examiner*—Alison K. Pickard
*Attorney, Agent, or Firm*—Merchant & Gould P.C.

[57] ABSTRACT

A coupler for coupling flanged fluid conducting tubes end-to-end in a sealed manner, thereby preventing contact between the fluid flowing through the tubes and the coupler. The coupler includes a body having an interior surface defining an axially extending passage, with the passage being sized so that a first, enlarged end portion of a first fluid conducting tube and a second, enlarged end portion of a second fluid conducting tube can be disposed therein in an end-to-end relationship with a gasket therebetween. The interior surface of the body is provided with a fastening mechanism whereby the first enlarged end portion can be removably secured within the passage of the body. Additionally, the body includes a ball locking mechanism whereby the second enlarged end portion can be clamped to the first enlarged end portion with the gasket therebetween. A sleeve is slideably disposed on an outer peripheral surface of the body, with the sleeve being slideable relative to the body between a first non-locking position and a second locking position. The ball locking mechanism is actuatable by the sleeve as the sleeve moves from the first to the second position. A circumferential detent is formed on the interior surface of the sleeve, with the balls of the ball locking mechanism fitting into the detent when the sleeve is in the locking position.

26 Claims, 4 Drawing Sheets

2

SANITARY QUICK CONNECTOR

FIELD OF THE INVENTION

This invention relates to a coupling for securing two fluid conducting tubes together. The coupling disclosed herein has particular use in the food processing, dairy, beverage, pharmaceutical, and biotechnology industries.

BACKGROUND OF THE INVENTION

A typical fluid coupling arrangement for connecting two flanged fluid conducting tubes together includes a clamp assembly having two clamp members pivoted together at one end with a locking mechanism at the opposite ends of the clamp members to secure the opposite ends together, such that the clamp members form generally a circle around the flanges of the tubes to thereby clamp the flanges together. In use, the tubes are placed end to end such that the flanges thereof are adjacent each other with a gasket therebetween. The clamp members are then disposed around the flanges and secured together by the locking mechanism, thus clamping the flanged tubes together in a fluid tight manner.

This type of coupling is generally difficult and cumbersome to operate, requiring two hands to operate. Further, with certain designs of this coupling arrangement a problem arises when the tubes are pressurized and the locking mechanism is not completely tightened. In this situation, fluid may leak from between the joined flanges due to a gap that typically exists between the outer perimeter of the gasket and the inner surfaces of the clamp members. The pressurized fluid causes the gasket to blow out, because of the gap, thus permitting fluid to escape. This problem is of particular concern in industries in which sanitary conditions must be maintained, where if a fluid leak occurs, the system must be shut down to permit the system to be sanitized. This is both time consuming and expensive.

Other known coupling arrangements for connecting fluid conducting tubes include U.S. Pat. Nos. 5,390,963; 4,776, 614; 4,366,945; and 3,655,225. However, none of these couplings is able to connect two flanged tubes end to end with a gasket between the flanges of the tubes. This means that portions of the coupling arrangement are wetted by the fluid flowing through the tubes, thus precluding the use of these couplers in situations where sanitary conditions must be maintained.

Therefore a need exists for an improved coupling that is able to couple two flanged fluid conducting tubes in an end to end relationship with a gasket between the flanges, such that none of the surfaces of the coupling are wetted by the fluid within the tubes. The coupling should be quick and easy to use, permit one-handed operation, and further prevent seal blow out.

SUMMARY OF THE INVENTION

Therefore the general purpose of the present invention is to provide an improved coupler for coupling flanged fluid conducting tubes end-to-end in a sealed manner, thereby preventing contact between the fluid flowing through the tubes and the coupler. The coupler can thus be used to couple tubes in industries where sanitary conditions must be maintained. The coupler is ergonomically designed to allow quick and easy, one-handed operation, and is further designed to prevent seal blow out.

A preferred embodiment of the coupler in accordance with the principles of the present invention includes a body having an interior surface defining an axially extending passage, with the passage being sized so that a first, enlarged end portion of a first fluid conducting tube and a second, enlarged end portion of a second fluid conducting tube can be disposed therein in an end-to-end relationship with a gasket therebetween. The interior surface of the body is provided with fastening means whereby the first enlarged end portion can be removably secured within the passage of the body. Additionally, a ball locking mechanism is disposed on the body whereby the second enlarged end portion can be clamped with the first enlarged end portion with the gasket therebetween. A sleeve is slideably disposed on an outer peripheral surface of the body, with the sleeve being slideable between a first non-locking position and a second locking position. The ball locking mechanism is actuatable by the sleeve as the sleeve moves between the first and second positions.

In one embodiment, a circumferential detent is formed on the interior surface of the sleeve, with the balls of the ball locking mechanism fitting into the detent when the sleeve is in the locking position. The engagement of the balls within the detent prevents axial movement of the sleeve until a radially outward loading on the balls is released. Therefore, the sleeve cannot be moved to the non-locking position, either intentionally or inadvertently, until the radial loading is released.

The coupler thus clamps the two tubes in an end-to-end relationship with the gasket therebetween to provide a fluid tight joint, with none of the working fluid flowing through the tubes contacting the body or sleeve of the coupler. The coupler releases and locks the tubes through simple axial and circumferential sliding movements of the sleeve on the body. The periphery of the gasket is located adjacent to the interior surface of the body such that radial blow out of the gasket is prevented, thus ensuring that the joint remains fluid tight.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

BRIEF DESCRIPTION OF THE DRAWINGS

Referring to the drawing, wherein like numerals represent like parts throughout the several views.

DETAILED DESCRIPTION OF THE PREFERRED EMBODIMENT

Figure 1:
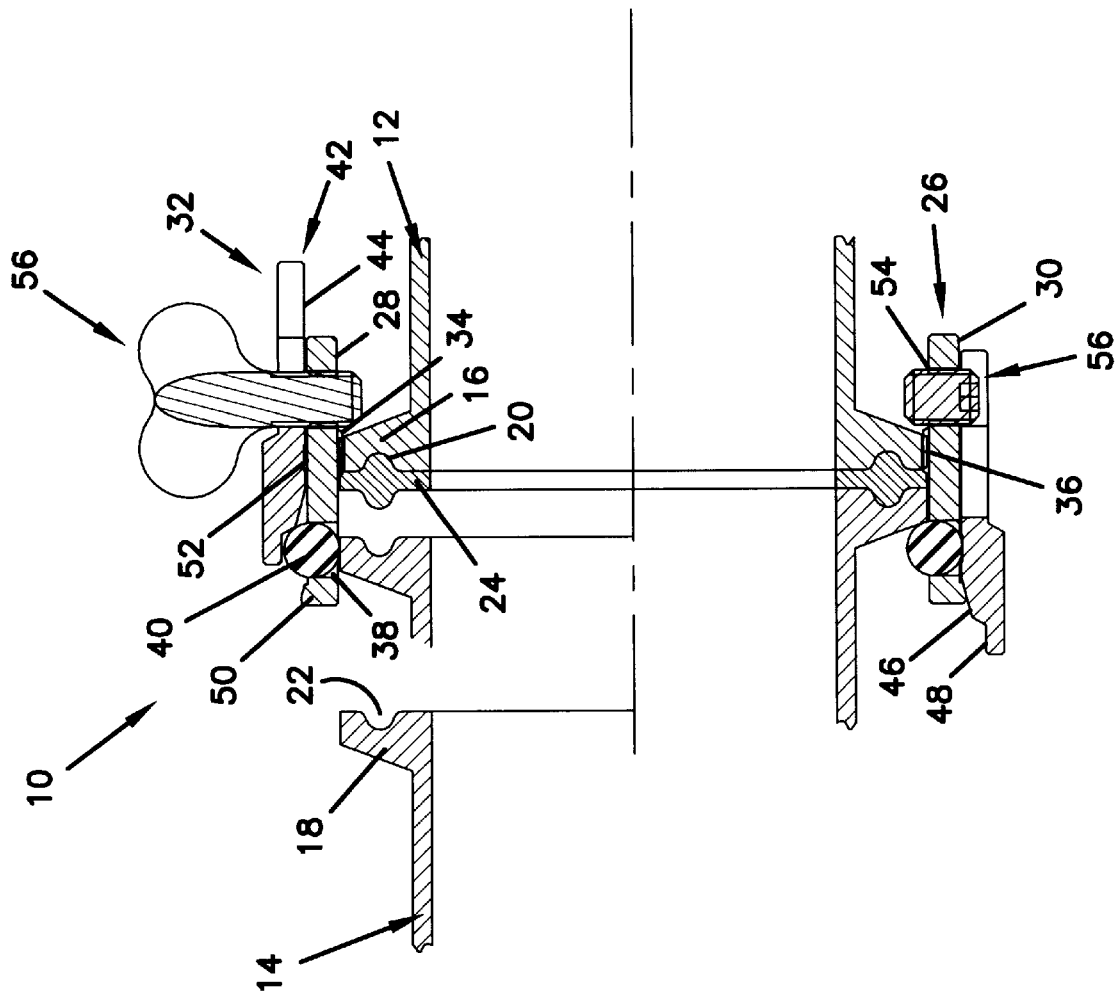
FIG. 1 is a side view of a coupling according to a first embodiment of the invention, with the top half thereof illustrating the coupling and tubes in a disconnected configuration, and the bottom half illustrating the coupling and tubes in a connected configuration.

With reference now to FIG. 1, a quick connect sanitary coupler or connector 10 is illustrated. The coupler is used to connect two fluid conducting tubes 12,14 in a sealed manner, without any of the structure of the coupler being wetted by the fluid flowing through the tubes during use. Since the coupler 10 is not wetted by the fluid, the sanitary conditions of the fluid and tubes is maintained. The coupler is therefore particularly useful in industries where sanitary conditions must be maintained, such as the food processing, dairy, beverage, pharmaceutical, and biotechnology and like industries.

Each tube 12,14 includes a flange or enlargement 16,18, respectively, at one end, that are intended to be connected in facing relationship to each other by the coupler 10. The flanges 16,18 include generally vertically extending faces having circumferential recesses 20,22, respectively, formed therein, and angled faces opposite the vertically extending faces. A gasket 24 is disposed between the vertical faces of the flanges with circumferential projections on each gasket 24 disposed within the recesses 20,22. This type of flange and gasket arrangement is known in the art and is thus not further described herein.

The coupler 10 includes a cylindrical body 26 having an interior surface 28 and an exterior surface 30, and a sleeve 32 is slideably disposed on the exterior surface 30. The interior surface 28 defines an axially extending cylindrical passage, with the peripheral surfaces of the flanges 16,18 being disposed adjacent to, or in contact with, the interior surface. Further, as can be seen in FIG. 1, the interior surface 28 is located closely adjacent to the outer edge of the gasket 24 and provides support therefore, such that radial displacement and blow out of the gasket is prevented.

A threaded portion 34 is formed on the interior surface 28 of the body 26 intermediate the ends thereof, and the outer peripheral surface of the flange 16 is similarly threaded 36 to permit threaded securement of the flange within the passage of the body. The threads 34,36 are preferably left-handed threads so that counterclockwise rotation of the flange advances the flange along the threads and further into the passage.

The body 26 includes a locking mechanism associated therewith that engages the angled face of the flange 18 for clamping the flange against the gasket. The locking mechanism comprises a plurality of circumferentially spaced holes 38 formed through the body 26, with a locking ball 40 disposed within each hole. The balls are moveable up and down within the holes to either clamp the flange 18 against the gasket or permit withdrawal of the flange from within the passage of the body, depending upon the position of the sleeve 32 on the body.

The sleeve 32 is generally cylindrical and is axially and circumferentially slideable on the exterior surface of the body 26. The sleeve 32 is slideable between a non-locking position (illustrated by the top half of FIG. 1) and a locking position (illustrated by the bottom half of FIG. 1). The sleeve 32 includes an interior surface 42 that faces the exterior surface 30 of the body, with the surface 42 including a first horizontal portion 44, an angled ramp portion 46, and a second horizontal portion 48.

With reference to FIG. 1, it can be seen that in the non-locking position of the sleeve, the horizontal portion 48 is located above the balls 40 to permit radial movement of the balls, thus allowing the flange 18 to be moved into, or removed from, the passage of the body. When the tube 14 is to be connected to the tube 12, the flange 18 is inserted within the body 26 until it engages the gasket. The sleeve 32 is then slid to the left in FIG. 1 until the locked position is reached. As the sleeve is being moved to the locked position, the ramp portion 46 engages the balls 40 and pushes them downward further into the holes 38 and behind the flange 18. Sliding movement of the sleeve occurs until the ramp portion 46 contacts a raised, angled lip 50 on the end of the body 26, thus defining the locking position. In the locking position of the sleeve, the horizontal portion 44 contacts the outer surface of the balls, thus preventing radial outward movement thereof. The balls, which contact the angled backside of the flange 18, clamp the flange 18 against the gasket 24, with the balls being locked in place by the horizontal portion 44.

A shallow, circumferential detent or recess 52 is formed in the horizontal portion 44 at a location corresponding to the locking position so as to receive the balls 40 therein when the sleeve is slid forward on the body to the locking position as shown in the bottom half of FIG. 1. The detent 52 provides a positive locking of the position of the sleeve to prevent axial movement of the sleeve to the non-locking position, as will be explained below in detail. However, use of the detent is optional as is illustrated by the embodiment shown in FIG. 3.

Figure 2:
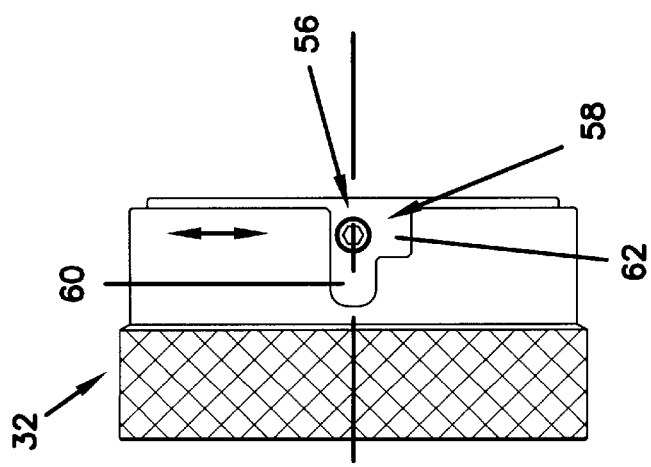
FIG. 2 is a view of the coupling illustrating the locking slot in the sleeve.

A means is provided on the coupler 10 for limiting the axial and circumferential movements of the sleeve 32 relative to the body 26. The limiting means includes a hole 54 formed through the body 26, and a projection 56 secured within the hole. An L-shaped locking recess 58, best seen in FIG. 2, is formed in the sleeve through which the projection 56 extends. The hole 54 is preferably a threaded hole and the projection 56 is preferably a threaded member, such as a thumbscrew, as illustrated by the top half of FIG. 1, or a set screw, as illustrated by the bottom half of FIG. 1, in order to permit the threaded member to be removed from the hole so that the sleeve can be removed from the body. However, other projecting members can be used if desired, with the projections either being removable or permanently connected to the body. For instance, the projection can be a rod-like member permanently connected to the body and extending through the locking recess 58. The projection 56 can also be extended downward so that it contacts the angled face of the flange 16 to prevent relative rotation of the flange and the body.

The recess 58 includes an axially extending portion 60 and a circumferential portion 62 extending from the axial portion. When the projection is aligned with the axial portion 60, as shown in FIG. 2, axial sliding movements of the sleeve on the body are permitted. Circumferential sliding movements of the sleeve relative to the body are permitted by aligning the projection 56 with the circumferential portion 62.

As seen in the top half of FIG. 1, in the non-locking position of the sleeve, the projection 56 is located at the closed end of the axially extending portion 60. In this position, circumferential movements of the sleeve relative to the body are prevented due to engagement between the projection and the axial portion 60 of the recess. In order to move the sleeve to the locking position, the sleeve is slid to the left in FIG. 1, until the raised lip 50 contacts the ramp portion. The projection will thus be located at the juncture of the axial and circumferential portions of the recess. The sleeve is then circumferentially rotated relative to the body until the projection is disposed at the closed end of the circumferential portion 62.

In use, the tube 12 is initially secured within the body by threading the flange 16 into the threaded portion 34. The sleeve 32 is moved to the disconnect position and the flange 18 then inserted into passage of the body 26, with the gasket disposed between the two flanges, until the flanges 16,18 and gasket are engaged with each other. The sleeve is then slid axially on the body toward the locking position, thus forcing the balls downward and into engagement with the flange 18. Axial sliding of the sleeve occurs until the ramp portion 46 contacts the lip 50, at which point the balls of the locking mechanism are disposed in the detent 52 and the flanges and gasket will be clamped together. During this movement, the projection moves from the closed end of the axial portion 60 of the locking recess to the open end thereof.

The sleeve 32 is then rotated in the clockwise direction. The sleeve rotates relative to the body 26 until the closed end of the circumferential portion 62 engages the projection 56, at which point the sleeve and body will rotate together. Further clockwise rotation of the sleeve and body forces the flange 16 of the tube 12 toward the flange 18 due to the left handed threads of the flange 16 and the threaded portion 34, thereby increasing the clamping force of the joint. Thus it should be apparent to one having ordinary skill in the art that after the sleeve is axially moved to the left in FIG. 1, which forces the balls downward to initially clamp the flanges and gasket together, the joint between the flanges and gasket is tightened by rotating the sleeve and body in a clockwise direction, which forces the flange 16 toward the flange 18, thereby increasing the clamping force. Clockwise rotation continues until the sleeve and body cannot be further rotated. By forcing the flange 16 toward the flange 18, the angled face of the flange 18, which contacts the balls 40, generates a radial outward force on the balls 40 so as to force the balls into the detent 52. Any pressure within the tubes 12, 14 further contributes to the radial loading of the balls, by generating a force that tends to force the flanges away from each other, so that the angled face of the flange 18 generates a further radially outward force on the balls. This radial loading of the balls within the detent prevents any axial movements of the sleeve on the body until the radial loading is released. Therefore, once the flanges are joined and the coupling is tightened, intentional and inadvertent release of the coupler is prevented. Release of the radial loading is achieved by rotating the sleeve and body in a counter-clockwise direction, thereby moving the flange 16 away from the flange 18 and releasing the radial force on the balls. Since the balls are no longer radially forced into the detent, the balls can be released from the detent when the sleeve is forced toward the disconnect position.

Since the radial loading of the balls within the detent 52 prevents axial movements of the sleeve until the loading is released, the circumferential portion 62 of the locking recess 58 merely adds a redundant measure against axial movements of the sleeve on the body. Therefore, it is clear that the recess 58 need not be L-shaped, but can instead be a simple axial recess with no circumferential portion. Thus, although the preferred embodiment illustrates the use of the detent 52 in combination with an L-shaped recess 58, the coupler 10 can operate equally well with the detent 52 in combination with an axial, or I-shaped, recess. Further, since the detent 52 and the circumferential portion 62 of the recess 58 each prevent axial movements of the sleeve on the body, the coupler 10 can be used without the detent 52, in which case the L-shaped recess 58, or even a T-shaped recess, would be relied upon to axially lock the sleeve. However, if the detent is not present, the radial loading of the balls does not need to be released in order to permit the sleeve to be axially moved to the disconnect position. In this case, the sleeve can be axially moved by simply aligning the projection with the axial portion of the recess, and pulling the sleeve backward.

In addition to permitting the flange 16 to be forced toward the flange 18 to thereby generate a radial outward loading on the balls within the detent, the threaded connection between the flange 16 and body 26 permits the axial spacing between the balls 40 and the seal to be adjusted, thus allowing the coupling to accommodate flanges 18 having varying thicknesses. The coupler can thus be used with a large variety of flanged tubes.

Figure 3:
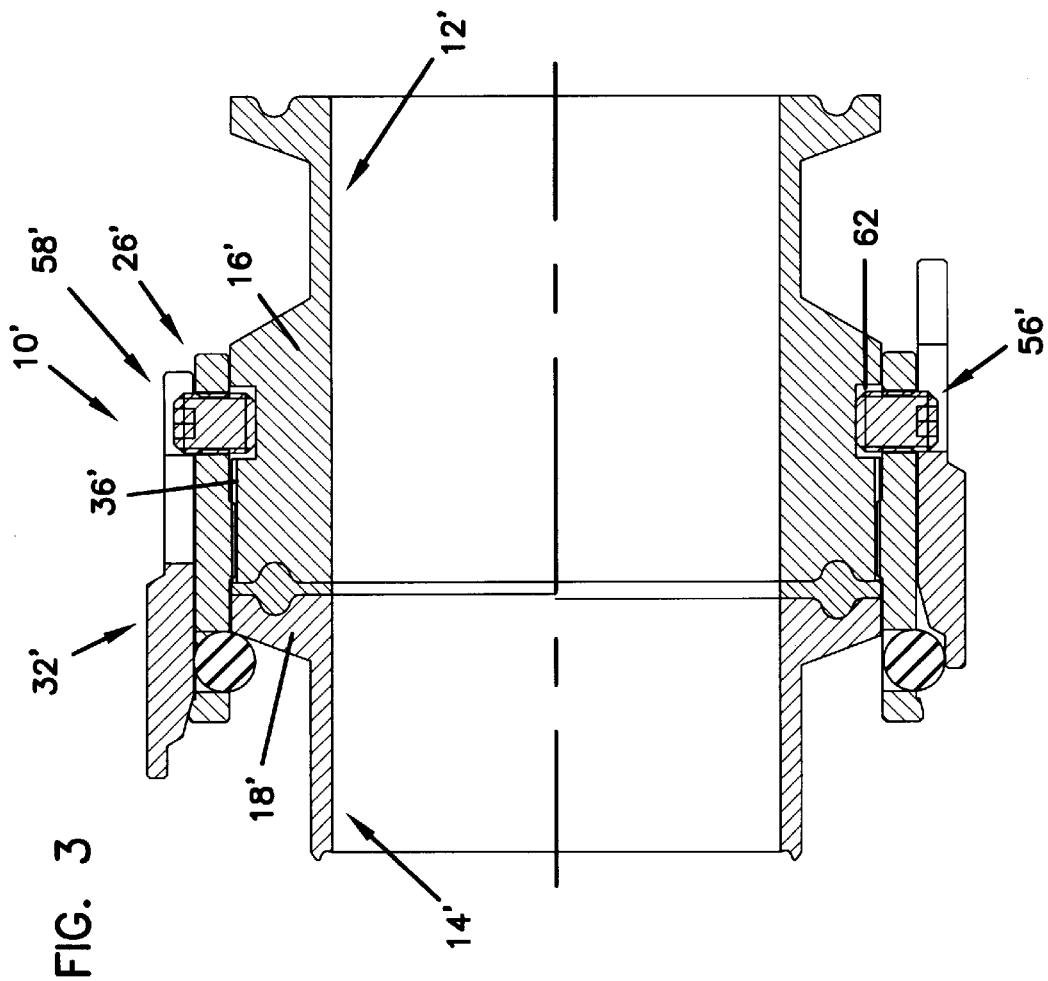
FIG. 3 is a side view of a coupling according to a second embodiment of the invention, with the top half thereof illustrating the coupling and tubes in a connected configuration, and the bottom half illustrating the coupling in a disconnected configuration.

FIG. 3 illustrates a further embodiment of the coupler 10', in which elements similar to the elements in the embodiment of FIGS. 1–2 are referenced by like reference numerals but with a prime designation. The coupler 10' differs from the coupler 10, in that the tube 12' includes an axially elongated flange portion 16', instead of the flange 16, and the detent 52 is not used. In this embodiment, the portion 16' is threaded 36' like the flange 16, but the portion extends out the end of the body 26'. A recess 62 is formed in the flange portion, and the projection 56' engages in the recess to lock the tube 12' relative to the body 26'.

In order to permit clockwise rotation of the sleeve and body relative to the flange portion 16', which as explained above with regard to FIG. 1 forces the flange portion 16' toward the flange 18' to thereby clamp the flanges and gasket tightly together, the projection 56', which is preferably a thumbscrew or a set screw, must first be withdrawn from the recess to permit rotation of the tube and the body relative to the flange portion 16'. Once the joint is tight and further clockwise rotation is not possible, the projection is re-engaged within the recess 62, thereby preventing further movement of the tube relative to the body and sleeve.

As explained previously, since the detent is not provided on the inner surface of the sleeve, the recess 58' should be L-shaped as shown in FIG. 2, or T-shaped, to prevent axial movements of the sleeve on the body when the projection is disposed within a circumferentially extending portion of the recess 58'. However a detent can be utilized in this embodiment if desired.

Figure 4:
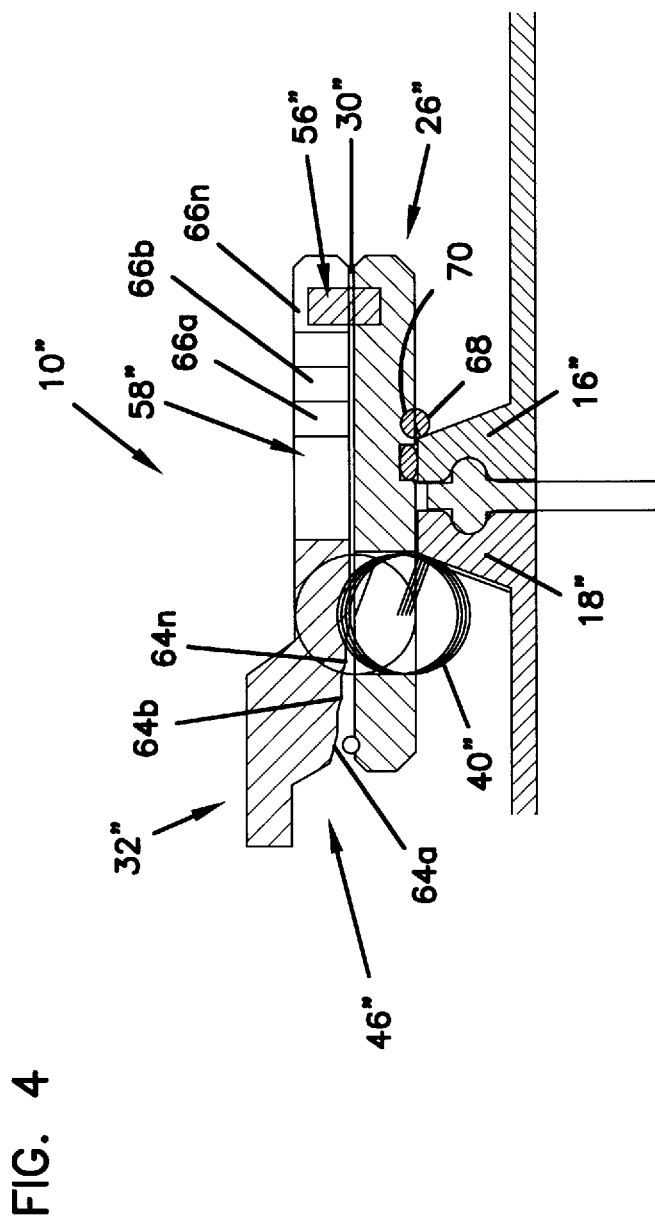
FIG. 4 is a side view of an additional embodiment of the coupling.

An additional embodiment of a coupler 10" is illustrated in FIG. 4, where it can be seen that the angled ramp portion 46" is formed by a plurality of ramp sections 64a,b . . . n such that the detent balls 40" can be forced downward to different radial locations, as illustrated by the different positions of the ball in FIG. 4. The locking recess 58" is similarly provided with a series of steps or circumferential portions 66a,b . . . n corresponding to each of the ramp sections of the angled ramp portion 46", such that the sleeve 32" can be locked at each of the different positions.

The embodiment of FIG. 4 further includes a snap ring 68 disposed within a recess 70 in the interior surface of the body 26" to secure the flange 16" within the passage of the body. This embodiment thus eliminates the threads used in the first embodiment which permitted the flanges and gasket to be tightly clamped and allowed adjustment of the distance between the detent balls and the seal to accommodate different sized flanges 18. The embodiment of FIG. 4 permits different clamping forces to be applied, and accommodates different flange sizes, due to the ramp sections 64a,b . . . n and the steps or circumferential portions 66a,b . . . n in the locking recess. Further, the projection 56" is modified such that it extends only from the exterior surface 30" of the body into the locking recess, thereby eliminating the through hole 54. The projection 56" is preferably a non-threaded member that is secured to the body in any appropriate manner; however the projection 56" could be a threaded member, such as a set screw or thumbscrew, that is disposed within a threaded hole in the body.

Figure 5:
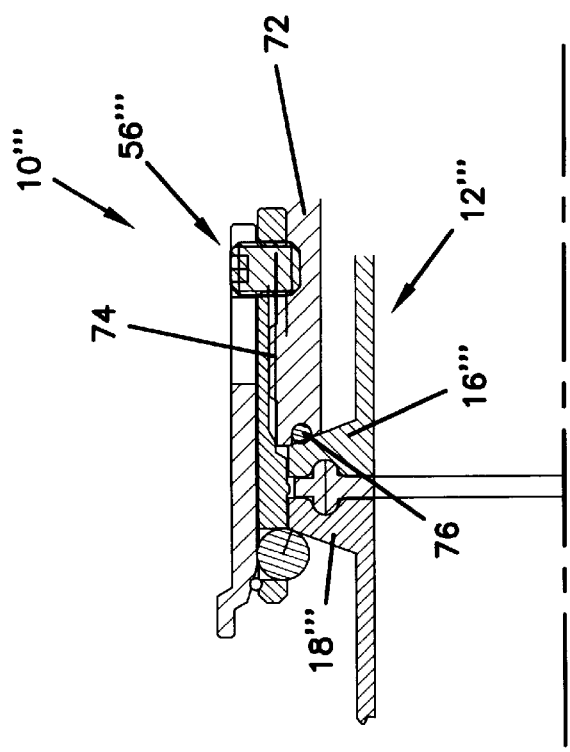
FIG. 5 is a side view of yet another embodiment of the coupling.
Figure 6:
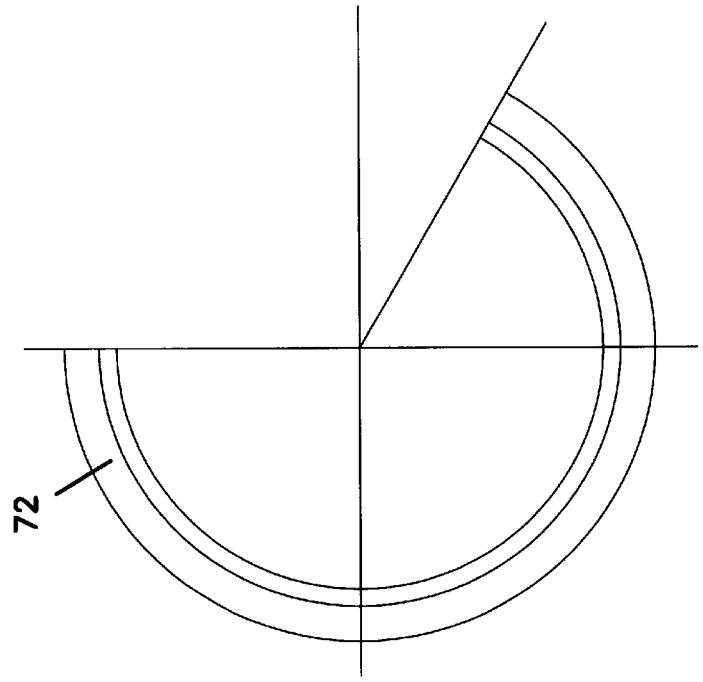
FIG. 6 shows the split ring used with the embodiment of FIG. 5.

FIG. 5 illustrates another embodiment of a coupler 10''' which includes a tube 12''' similar to the tube 12. However, the flange 16''' of the tube 12''' is not threaded, but is instead smooth. A split ring 72 is disposed between the tube 12''' and the body 26, with the outer surface of the split ring being threaded 74 so as to engage with a thread on the interior surface of the body. As in the first embodiment, the threads are left-handed threads. The split ring 72, as seen in FIG. 6, is a partial circular member to permit the split ring to fit around the tube 12'''. Similar to the second embodiment shown in FIG. 3, the projection 56''' extends into a recess formed in the split ring to secure the body portion to the split ring to prevent relative rotation between the body and split ring. A rubber o-ring 76 is disposed between the end of the split ring and the flange 16''' to provide friction between the split ring and flange to prevent relative rotational movement between the split ring and flange.

The embodiment of FIG. 5 operates as follows. By removing the projection from the recess in the split ring 72, the sleeve and body can be rotated clockwise relative to the split ring to thereby cause the split ring and the flange 16''' to be advanced toward the flange 18''' so that the flanges and gasket are tightly joined. When clockwise rotation is no longer possible, the joint is fully tightened, and the projection is then re-engaged within the recess in the split ring to prevent further movement of the split ring relative to the sleeve and body.

It is to be understood that while certain embodiments of the present invention have been illustrated and described, the invention is not limited to the specific forms or arrangements of parts described and shown.

We claim:

1. A quick connect coupler, comprising:
    a body having an interior surface defining an axially extending passage between a first end and a second end of the body, said passage being sized whereby a first, enlarged end portion of a first fluid conducting tube and a second, enlarged end portion of a second fluid conducting tube can be disposed within the passage in an end-to-end relationship with a gasket therebetween and a peripheral surface of each of the first and second enlarged end portions is located adjacent the interior surface;
    fastening means on the interior surface of the body whereby the first enlarged end portion can be removably secured within the passage of said body;
    a locking mechanism disposed on the body whereby the second enlarged end portion can be locked within the passage of said body;
    a sleeve slideably disposed on an outer peripheral surface of said body, said sleeve including a third end and a fourth end, and said sleeve being slideable relative to said body between a first non-locking position and a second locking position, and said locking mechanism being actuatable by said sleeve as said sleeve moves from the first non-locking position to the second locking position, and said third end extends past said first end of said body when said sleeve is at the first non-locking position, and said fourth end extends past said second end of said body when said sleeve is at the second locking position; and
    wherein said sleeve and said body are rotatable together.

2. The quick connect coupler according to claim 1, wherein the passage is sized such that the interior surface of the body is located adjacent a peripheral edge of the gasket.

3. The quick connect coupler according to claim 1, wherein the fastening means and the locking mechanism are arranged whereby when the first and second enlarged end portions are disposed end-to-end with the gasket therebetween an interior of the first and second fluid conducting tubes is not in fluid communication with the interior surface of the body.

4. The quick connect coupler according to claim 1, wherein said sleeve is axially slideable relative to said body, and further including a projection extending from the body for limiting axial movements of the sleeve on the body.

5. The quick connect coupler according to claim 4, wherein said sleeve is circumferentially slideable relative to said body, and wherein said projection limits circumferential sliding movements of the sleeve relative to the body.

6. The quick connect coupler according to claim 5, wherein said sleeve includes a slot formed therein, and said projection extends from the body and into said slot.

7. The quick connect coupler according to claim 6, wherein said projection comprises a threaded member.

8. The quick connect coupler according to claim 6, wherein said projection extends through said body and contacts the first fluid conducting tube to thereby lock the first fluid conducting tube relative to the body.

9. The quick connect coupler according to claim 6, wherein said projection extends through said body and into a recess formed in the first, enlarged end portion of the first fluid conducting tube to thereby lock the first, enlarged end portion relative to the body.

10. The quick connect coupler according to claim 6, wherein said slot includes a first, axial extending portion and a second, circumferential extending portion.

11. The quick connect coupler according to claim 10, wherein said sleeve is slideable relative to said body whereby the projection is disposed within an end of said first, enlarged end portion in the first non-locking position and disposed within an end of said second, enlarged end portion in the second locking position.

12. The quick connect coupler according to claim 10, wherein said locking mechanism comprises a ball locking mechanism including a plurality of circumferentially spaced holes formed through the body and a ball disposed in each said hole.

13. The quick connect coupler according to claim 12, wherein said sleeve includes an interior surface having a ramp portion, said ramp portion being engageable with said balls of the locking mechanism as said sleeve is moved from said first non-locking position to said second locking position.

14. The quick connect coupler according to claim 13, wherein the interior surface of said sleeve further includes a circumferential detent formed therein, the balls of said ball locking mechanism engaging within said detent when said sleeve is in the second locking position.

15. The quick connect coupler according to claim 13, wherein said body includes an angled lip portion at one end thereof, said angled lip portion engaging with said ramp portion when said sleeve is in the second locking position.

16. The quick connect coupler according to claim 1, wherein said fastening means comprises a threaded portion formed on the interior surface of the body.

17. The quick connect coupler according to claim 16, wherein said fastening means further comprises a split ring having an outer periphery with a threaded section engageable with said threaded portion, and an end of said split ring being engageable with the enlarged portion of the first fluid conducting tube.

18. A fluid joint, comprising:
    a coupling body having an interior surface defining an axially extending passage;

a first fluid conducting tube secured within said passage, said first fluid conducting tube having a first enlarged end portion disposed within said passage;

a second fluid conducting tube having a second enlarged end portion disposed within said passage adjacent to said first enlarged portion;

a gasket disposed between and engaged with said first and second enlarged end portions;

a ball locking mechanism disposed on the coupling body and engaged with the second enlarged end portion;

a sleeve slideably disposed on an outer peripheral surface of said body, said sleeve being slideable between a first non-locking position and a second locking position, and said ball locking mechanism being actuatable by said sleeve into locking engagement with said second enlarged end portion as said sleeve moves from the first non-locking position to the second locking position; and wherein said sleeve and said body are rotatable together to thereby increase the seal between said first end portion and said second end portion.

19. The fluid joint according to claim 18, wherein said sleeve includes an interior surface having a circumferential detent formed therein, the balls of said ball locking mechanism engaging within said detent when said sleeve is in the second locking position.

20. The fluid joint according to claim 18, wherein the interior surface of the body is not in contact with a fluid flowing through the first and second fluid conducting tubes.

21. A coupler for coupling first and second fluid conducting tubes, each tube having an end portion, comprising:

a body adapted to receive the end portion of the first fluid conducting tube and the end portion of the second fluid conducting tube therein with the end portions being in sealed engagement with each other;

a sleeve slideably disposed on an outer peripheral surface of said body, said sleeve being slideable between a first position at which the end portions are held together in sealed engagement and a second position at which one of the end portions can be disengaged from the other end portion, and said sleeve and said body being rotatable together to increase the sealed engagement of the end portions;

means for increasing the sealed engagement of the end portions upon integral rotation of said sleeve and said body; and means for preventing sliding movement of the sleeve from the first position to the second position, thereby preventing disconnection of the end portions.

22. The coupler according to claim 21, wherein said means for preventing sliding movement comprises a circumferential detent groove formed in an inner surface of the sleeve, and further including at least one detent ball disposed on said body, said at least one detent ball being engageable within the detent groove when the sleeve is at the first position.

23. The coupler according to claim 21, wherein said means for increasing the sealed engagement comprises threads, and wherein said threads cause at least one of the end portions to be forced toward the other end portion upon integral rotation of said sleeve and said body.

24. The coupler according to claim 23, wherein said threads comprise a set of threads formed on said body and a set of threads formed on one of said end portions, said sets of threads being engaged with each other.

25. The coupler according to claim 23, further comprising a split ring engaged with one of the end portions, and wherein said threads comprise a set of threads formed on said body and a set of threads formed on said split ring, said sets of threads being engaged with each other.

26. A coupler for coupling first and second fluid conducting tubes, each tube having an end portion, comprising:

a body adapted to receive the end portion of the first fluid conducting tube and the end portion of the second fluid conducting tube therein with the end portions being in sealed engagement with each other;

a sleeve disposed on an outer peripheral surface of said body, said sleeve being axially slideable relative to said body, and said sleeve being axially slideable between a first position at which the end portions are held together in sealed engagement and a second position at which one of the end portions can be disengaged from the other end portion;

means for preventing sliding movement of the sleeve from the first position to the second position, thereby preventing disconnection of the end portions;

at least one detent ball disposed on said body and engageable with one of the end portions, said at least one detent ball being actuated by said sleeve; and wherein said sleeve includes a plurality of angled ramp sections thereon that are engageable with said at least one detent ball, and said sleeve includes a slot formed therein, said slot including a plurality of steps corresponding to the plurality of angled ramp sections.

* * * * *